United States Patent [19]

Cheung

[11] Patent Number: 5,423,024
[45] Date of Patent: Jun. 6, 1995

[54] FAULT TOLERANT PROCESSING SECTION WITH DYNAMICALLY RECONFIGURABLE VOTING

[75] Inventor: Douglas D. Cheung, Braintree, Mass.

[73] Assignee: Stratus Computer, Inc., Marlboro, Mass.

[21] Appl. No.: 882,474

[22] Filed: May 13, 1992

Related U.S. Application Data

[63] Continuation of Ser. No. 696,129, May 6, 1991.

[51] Int. Cl.$^6$ ............................................. G06F 11/08
[52] U.S. Cl. .................................................... 395/575
[58] Field of Search .......................... 371/36, 8.1, 9.1;
364/269.1; 395/575

[56] References Cited

U.S. PATENT DOCUMENTS

| | | | |
|---|---|---|---|
| 3,460,094 | 8/1969 | Pryor | 371/36 X |
| 3,593,307 | 7/1971 | Gouge | 371/36 X |
| 3,665,173 | 5/1972 | Bouricius et al. | 235/153 |
| 3,681,578 | 8/1972 | Stevens | 235/153 |
| 3,783,250 | 1/1974 | Fletcher | 235/153 AK |
| 4,412,281 | 10/1983 | Works | 364/200 |
| 4,521,745 | 6/1985 | Falconer | 331/2 |
| 4,562,575 | 12/1985 | Townsend | 371/9.1 |
| 4,583,224 | 4/1986 | Ishii | 371/36 |
| 4,610,013 | 9/1986 | Long | 371/9.1 |
| 4,622,667 | 11/1986 | Yount | 371/9.1 |
| 4,654,846 | 3/1987 | Goodwin et al. | 371/8 |
| 4,739,498 | 4/1988 | Eichhorn | 365/200 |
| 4,799,140 | 1/1989 | Dietz | 364/140 |
| 4,907,232 | 3/1990 | Harper et al. | 371/36 |
| 5,195,040 | 3/1993 | Goldsmith | 371/9.1 X |

OTHER PUBLICATIONS

Publication Extract entitled "Design Techniques to Achieve Fault Tolerance".
Yoichi Yano et al, "V60/V70 Microprocessor and its Systems Support Functions", Digest of Papers of the Spring Compcon '88, Feb. 28, 1988, San Francisco, Calif., pp. 36–42.
N. Prawitz, "Deux Microprocesseurs A Unites Specialisees—LES V60 ET V70", Electronique Industrielles, No. 13, Jun. 1987, Paris, FR, pp. 48–53.
R. Evers et al., "88K Fault Tolerance and Testability", Electronics Test, vol. 13, No. 4, Apr. 1990, San Francisco, Calif., pp. 51–57.

*Primary Examiner*—Robert W. Beausoliel, Jr.
*Assistant Examiner*—Glenn Snyder
*Attorney, Agent, or Firm*—Lahive & Cockfield

[57] ABSTRACT

A fault-tolerant digital data processor includes three identical logic CPU boards connected to a voting bus and a system bus. The three boards are initially designated as a master board, a slave board 0 and a slave board 1. The master board drives the system bus and the two slave boards serve as backups in case the master breaks. The master board issues signals, at different instances with the aid of multiplexing, to the slave boards. On the slave boards, corresponding signals are compared and the result is broadcast to all three boards. When all three boards are compared equal, the master board remains as master. If there is a miscompare between one slave board and the master but not between the other slave board and the master, the master board remains master, and the slave board with which the miscompare occurred will be disabled after another miscompare. If a miscompare occurs between the master board and both slave boards, a re-execution of the previous cycle occurs. After a master board failure is confirmed, a slave board becomes a master board, and if there is another comparison failure the former master board is disabled.

13 Claims, 8 Drawing Sheets

*STATE2 IS SUPPRESSED IN READ CYCLE. THE REASON IS THAT THERE IS NO NEED TO COMPARE DATA FOR READ CYCLES

*THIS SIGNAL ONLY EXISTS IN THE CPU BOARD

FAULT TOLERANT PROCESSING SECTION WITH DYNAMICALLY RECONFIGURABLE VOTING

REFERENCE TO RELATED APPLICATION

This application is a continuation of copending, commonly-assigned United States Patent Application Ser. No. 696,129, filed May 6, 1991.

BACKGROUND OF THE INVENTION

This invention pertains to fault-tolerant computer systems and particularly to dynamically reconfigurable voting systems.

As computers take increasingly critical roles in the society, simply augmenting the quality of components and improving design techniques can not provide adequate computer reliablity to meet established needs. Computers must be able to function as failures are encountered. In today's computer parlance, this translates into computer fault tolerance.

Fault tolerance is essential for environments that require support to on-line continuous processing such as the banking industry, finance, tele-communication, air-traffic control, military application, retailing, etc. Since the start of the last decade, commercial computer manufacturers have devised a variety of architectures to support fault tolerance.

With the advent of microprocessors, computer systems have moved from the clean environments of computer rooms to industrial environments. A harsher environment makes environmental variables of a computer system fluctuate dramatically, e.g., temperature and humidity level, primary power supply fluctuation and electromagnetic interference. These factors will likely induce computer failures.

A second reason for computer failure that is commonly cited by computer industry experts is the inadvertent user abuse due to the proliferation of computers and the lowered level of computer literacy among average computer users.

Thirdly, as computer systems grow ever larger, there are more components in the system and subsequently, the probabilty of system failure due to the malfunction of any component increases.

In a computer system, failures can be generated from several levels that are parallel to the levels in the digital computer system. The first is the circuit level. This level consists of such components as resistors, capacitors, inductors, and power sources. The second level consists of logic gates and data operators built out of gates. Logic gates can be further divided into two categories of combinational and sequential logic gates. The next level is the program level. The program level is unique to digital computers. At this level a sequence of instructions in the device is interpeted and causes action upon a data structure. This is the Instruction Set Processor sublevel. The ISP description is used in turn to create software components that are easily manipulated by programmers—the high-level-language sublevel. The result is software, such as operating systems, runtime systems, application programs, and application systems. The last level in a computer system is the programming memory switch (PMS) level. This level includes the input/output devices, memories, mass storage, communications, and processors. They are all interconnected to form a computer system.

The sources of computer failures can be catagorized in the following way:

Failure. Physical change in hardware.

Fault. Erroneous state of hardware or software resulting from failures of components, physical interference from the environment, operator error, or incorrect design.

Error. Manifestation of a fault within a program or data structure. The error may occur some distance from the fault site.

Permanent. Describes a failure, fault, or error that is continuous and stable. In hardware, permanent failure reflects an irreversible physical change. The word hard is used interchangeably with permanent.

Intermittent. Describes a fault or error that is only occasionally present due to unstable hardware or varying hardware or software states.

Transient. Describes a fault or error resulting from temporary environmental conditions. The word soft is used interchangeably with transient.

The relationship of these classes of computer error is illustrated in FIG. 1.

There are two important measurements of fault tolerant capabilities in a computer system. The first is availability. Availability is a function of time. It is the probability that the system is operational at the instant of time. The second measurement is reliability. It is the conditional probability that the system has survived the interval [0, t], given that it was operational at time t=0. Reliability is used to describe systems in which repair cannot take place (as in satellite computers) or in which the computer is serving a critical function and cannot be lost even for the duration of a repair (as in flight computers on aircraft) or in which the repair is prohibitively expensive.

Aside from apparent benefit of having a computer system that can function without interruption in the event of computer failure, it is economically sound to own a fault tolerant computer system. The cost of a computer system is not limited to initial purchase; significant costs recur during the life of a system. A fault tolerant computer system not only reduces the cost of maintanence, it reduces the cost of downtime significantly.

Software-fault tolerance and hardware-fault tolerance share many common features such as redundancy, self-checking, etc. with different focuses. Software-fault tolerance aims at eliminating computer error due to false software design and programming. Hardware-fault tolerance aims at eliminating computer error due to hardware failures.

Both experimental and real-life fault tolerant systems have begun to use design diversity to tolerate software faults. Such systems focus strongly on design faults, where the term "design" encompasses everything from system requirements to realization during both initial production and future modifications. Design faults are a source of common-mode failures, which defeat fault-tolerant strategies based on strict replication and generally have catastrophic consequences.

In a diversified design, the different systems produced from a common service specificaion are called variants. A diversified design has at least two variants plus a decider, which monitors the results of variant execution, given consistent initial conditions and inputs. The common specification must explicitly address the decision points, that is, it must state when to make decisions and what data to base them on.

The best-documented techniques for tolerating software design faults are the recovery block (RB) approach and N-version programming (NVP). In the first approach, the variants are called alternates and the decider is an acceptance test, which is applied sequentially to the alternates' results. If the results of the primary alternate do not satisfy the acceptance test, the secondary alternate executes. In the second approach, the variants are called versions, and the decider is a vote based on all versions' result.

Most of the real-life systems do not implement either a recovery block approach or N-version programming, but rather are based on self-checking software which consists of either a variant and an acceptance test or two variants and a comparison algorithm.

In implementing design diversity, there are two main considerations. First is the number of variants. Aside from economic considerations, the number of variants for a given software fault-tolerance method is directly related to the number of faults to be tolerated. The soft or solid nature of the software faults significantly affects the architecture only when it must tolerate more than one fault. Also note that an architecture tolerating a solid fault can also tolerate a infinite sequence of soft faults, provided there are no fault coincidences.

The second consideration is the level of fault-tolerance application. The level of application involves two questions: How much should the system be decomposed into components to be diversified? And which layers (application software, executive, hardware) must be diversified? The answer to the first question involves a trade-off between two opposing considerations: smaller components allow a better mastering of the decision algorithms, but larger components aid diversity. In addition, the decision points are "non-diversity" points (and synchronization points for N-self checking programming, NSCP and NVP); as such, they must limited. Decision points are necessary only for interactions with the environment (sensor data acquisition, delivering orders to actuators, operator interaction, etc.). However, performance considerations could prompt additional compromises.

Software-fault tolerance primarily deals with faults that are generated from errors in software design and programming. Hardware-fault tolerance deals with errors that are due to hardware design or circuit errors. It can be achieved through redundancy in hardware, software, information, and/or computations. A fault-tolerance strategy includes one or more of the following elements:

Error detection, masking, and correction. By comparing data from redundant hardware components, errors are detected. Faulty data will be dynamically corrected. The system must also be able to prevent the propagation of faulty data across the defined boundaries.

Diagnosis. This is a process in which the computer system identifies the faulty hardware components, (e.g., module, data path, section on logic board, etc.).

Repair/reconfiguration. A system is repaired either by replacing the failed module with a spare or by reconfiguring the system structure or work load distribution to circumvent the module. There are "hot" replacement and "cold" replacement. A hot spare concurrently performs the same operations as the module it is to replace, needing no initialization when it is switched into the system. A cold spare is either not powered or used for other tasks, requiring initialization when switched into the system.

Recovery. When there is a fault occurred in the computer system, correction needs to be made to restore the system to the initial state of continued operation.

The spare-and-pair implementation resorts to hardware redundancy to achieve fault tolerance. By comparing critical signals from two identical hardware components, the system detects error and removes faulty components from the system.

FIG. 2 illustrates a typical implementation of this scheme. In a Stratus On-Line Continuous Processing System, all hardware components are mirrored meaning that two components are identical and executing the same function. In FIG. 2, there are two CPU boards, CPU1 and CPU2. On each board, there are two identical data paths; each has a processor which is called A Side and B Side. Each side receives inputs from its own bus and drives its own bus. Each bus is wired-OR of one half of each board. On each board, the two sides constantly compare with each other. In the case of a disagreement, the red light is turned on and the board is removed from the system. In such event, the other board becomes the sole CPU board in the system.

The objective of this invention is to provide an improved fault-tolerant computer.

SUMMARY OF THE INVENTION

The invention is in a fault-tolerant digital data processor of the type having plural functional units interconnected along system bus means for transferring signals therebetween, wherein a first functional unit responds to an input signal received on the system bus means from one or more other functional units for performing a first processing function on that input signal to generate an output signal, and for applying that output signal to the system bus means for transfer to another functional unit. The invention provides that the first functional unit comprises (n) processing sections interconnected along voter bus means for transferring signals therebetween, and coupled to the system bus means for receiving corresponding ones of input signals therefrom. Each processing section comprises (a) processing means responsive to the input signal for performing a first processing function thereon to generate the output signals, (b) master means actuable in response to a master state signal for applying to at least one of the bus means the output signals generated in response to at least a selected input signal, (c) slave means actuable in response to a slave state signal for generating and applying to the voter bus means a signal representative of a comparison of (i) the output signal generated by the processing means of that processing section in response to the input signal corresponding to the selected input signal, and (ii) the output signal generated by the master means of another of the processing sections, and (d) state means coupled to the voter bus means and to each of the master and slave means, for maintaining a state of the respective processing section and for generating a signal representative of that state, the state means including means for selecting the state from a group of states including a master state and one or more slave states, and including voter means responsive to the state signal and to a combination of one or more match signal received on the voter bus means for selectively changing the state of the respective processing section.

In preferred embodiments, the invention further includes synchronizing means, coupled to the state means of each processing section, for placing one of those processing sections in the master state and the others of those processing sections in a slave state at a selected time, and includes the state means including means for maintaining only one of the processing sections in a master state at any given time.

Further, the inventions includes having (n) equal to three, and having the state means including means for selecting the state from a group of states including a master state and (n−1) slave states. Also, the voter means includes means for changing the state of the respective processing section as a function of the current state of that processing section and the combination of one or more match signals received on the voter bus means. Also, the slave means includes means for wire OR'ing their respective match signals onto the voter bus means.

Still further, the first functional unit is a central processing unit and the master means includes means for generating the output signal to include at least one of data, address and control information.

Preferably, the voter means includes means, responsive to the combination of one or more match signals received on the voter bus means indicating that all the output signals generated by the respective processing sections match, for not changing the state of the respective processing section. Also, a voter means associated with a processing section in the master state includes means, responsive to the master state signal and the combination of one or more match signals received on said voter bus means indicating that the output signal generated by the respective processing section matched the output signal generated by at least one other processing section, for not changing the state of the respective processing section.

Also, preferably, the voter means associated with a processing section in the slave state includes means responsive to the slave state signal and to (i) the combination of one or more match signals received on the voter bus means indicating that the output signal generated by the respective processing section did not match the corresponding output signal generated by a processing section associated with the master state, and (ii) the combination of one or more match signals received on the voter bus means indicating that the output signal generated by another processing section in said slave state did match the corresponding output signal generated by a processing section associated with the master state, for changing the state of the respective processing section from one slave state to another slave state. Also, the means are responsive to the slave state signal and to the combination of signals that do, and do not, respectively, match, to also change the state of the respective processing section from one slave state to another slave state.

Finally, preferably, the voter means of each of the processing sections includes means responsive to the combination of one or more match signals received on the voter bus means indicating that the output signal generated by a processing section associated with the master state did not match the corresponding output signal generated by a selected number of other processing sections in said slave state for (i) changing the state of the respective processing section, and (ii) re-performing the first processing function on the selected input signal to generate the output signal; the master means includes means for applying the output signal to the voter bus means; and the slave means includes means for comparing the output signal generated by the processing means of that processing section with the output signal received on the system bus means.

BRIEF DESCRIPTION OF THE DRAWINGS

Other objects, features and advantages will be set forth in, or will be inherent in, the following description of a preferred embodiment of the invention, including the drawings thereof, in which.

DESCRIPTION OF A PREFERRED EMBODIMENT

The computer system has two separate buses, a System Bus and a Voting Bus. The system bus, which contains all the data, address, and control signal lines, connects the CPU Board with the memory board. In a fully fault tolerant computer system, all signals are protected by hardware or software redundancy. To protect the computer system against faults on the system bus, this bus should be implemented with redundancy. But, for the simplicity of the design, the system bus will not contain features of redundancy and therefore it does not provide bus fault tolerance.

The Voting Bus is a bus that connects three identical logic CPU boards. Critical signals will be sent onto this bus for comparision and voting. The detailed description of the bus will be dealt with in subsequent sections.

Fault tolerance can be achieved by hardware or software redundancy. By comparing the redundant executions, errors and/or faults are detected. Inevitably, there are simplex Signals and/or simplex logic circuitries, i.e. the comparison device and the results of the comparison which the device generates. Albeit the degree of replication varies among different commercial computer designs, the comparator is always at the single point of failure or unprotected data path. It is established that the reliability of the comparison circuitry is sufficient provided that it has the minimal complexity. The three-way-voting employed in this computer system is based on the premise that the comparators are reliable devices and will not be replicated. Specifically, if signals from Board A and B are compared on Board A, they will not be compared on Board B.

There are three boards, Board A, B and C in the computer system. All three boards are mirrors of each other. Normally, all signals coming out of the three boards are identical. Therefore, only one board is required to drive the system bus. The three boards in the system will be assigned as master board, slave board 0 and slave board 1 respectively. The master board drives the system bus and the two slave boards serve as backups in case the master breaks.

The following table shows arbitrary assignments of master board and slave board.

| Master | Slave 0 | Slave 1 |
|--------|---------|---------|
| A | B | C |
| B | C | A |
| C | A | B |

Figure 3:
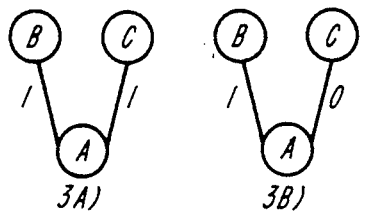
FIG. 3 illustrates diagrammatically, potential relations between three boards in the system of the invention.

In FIG. 3, A is the master board and Board B and Board C are the slave boards.

Board A issues signals, at different instances with the aid of multiplexing, to the slave boards, Board B and Board C. On Board B and C, corresponding signals are compared and the result is broadcast to all three boards.

As shown in FIG. 3(a), when Boards A, B and C compared equal, logic level "1" is generated as the result indicating comparison equal. Board A will remain to be the master board.

As shown in FIG. 3(b), there is a miscompare between Board A and Board C. Because Board A and B are equal, the voting machine identifies Board C as the minority board. Board A remains to be the master board with no effect on the executions on both Board A and Board B, i.e., no re-execution of the previous cycle is required. Board C will be disabled after one additional miscompare.

As shown in FIG. 3(c), miscompare occurs between both Board A and Board B, and Board A and Board C. This indicates that Board A is either a minority or all three boards are unequal. Unlike the situation in FIG. 3(b) where the broken board is not a master board, a re-execution of the previous cycle is required in this case. After Board A failure is detected, Board B becomes the master board. Board A loses control over the system bus. All three boards re-execute the previous cycle. As indicated in FIG. 3(d), comparison will occur between Board B and Board C, Board B and Board A. Board A will be disabled after a second comparison failure.

As we have seen, this system only needs one set of signals from one board to be driven on to the bus and the two individual slave board will compare that set of signals from the master board with its own corresponding signals locally. The assumption made here is that the comparator on the slave boards is sufficiently reliable that it does not requireredundancy. In this case, the signals generated on the slave boards are not compared by the master board conversely. Furthermore, by multiplexing address, data and control signals onto one bus, the number of bits on the bus are greatly reduced with the trade-off of increase in bandwidth of the bus.

By isolating faults in the system, this system allows one cycle of transient error. The number of transient errors allowed is decided arbitrarily. When a miscompare occurs, the failing board need not be disabled immediately as long as the master board is properly located.

Again, it is apparent that the design relies on the accuracy of the comparator logic. Therefore, comparator logic circuitry must have the least complexity.

As mentioned before, there are two discrete buses in the system. One is the system bus which connects all logical boards in the system. Several redundant boards which perform the same function are collectively called one logical board. For example, the three identical CPU boards in this system are collectively called one logical CPU board. The other bus is the Voting Bus as previously described.

The microprocessor used in the preferred embodiment is a Motorola 68000 microprocessor. It has a 16-bit data bus (D0–D15), 23-bit address bus (A1–A23 and A0 internal to the microprocessor), three-bit function code, and other control signals. A bus cycle consists of eight states. The various signals are asserted during specific states of a read cycle or write cycle. Utilizing this feature, different signals can be multiplexed on the same bus and captured at a different time. Therefore, the maximum number of bits required in the design will be 23 bits.

Following is a description of compare signals on the Voting Bus.

SLV_COMP_DATA[0 . . . 22] This is the data driven onto the Voting Bus by the current master board. After the data are driven onto the Voting Bus, they will be compared with the corresponding local signals by two slave boards. The result of the comparison will be broadcast onto the Voting Bus.

SLV_MISCOMP_L[0 . . . 1] These two bits are driven by the two slave boards. According to the value of these two bits, each individual board decides the action of next cycle.

A_INDEX[0 . . . 1], B_INDEX[0 . . . 1], C_INDEX[0 . . . 1] As indicated below, this two bit indicator identifies the board in a particular slot in the system. Each bit is pulled low or pulled high according the following scheme. Physically, this indicator is located at the System Bus.

| INDEX | MASTER |
|-------|--------|
| 0 0 | A |
| 0 1 | B |
| 1 0 | C |
| 1 1 | Not Used |

The system bus will have a 24-bit address bus, a 16-bit data bus, and a control logic bus that consists of a number of signals as follows.

BUS_ADR[0 . . . 23] This is a 24-bit address bus line that carries the address issued by the CPU Board.

BUS_DATA[0 . . . 15] This is a bidirectional 16-bit data bus which connects the CPU board and the memory board. When there is a 8-bit write or read, data will be aligned to bit 0.

FC[0 . . . 1] This 2-bit function code is issued by the CPU board which specifies a 16-bit or 8-bit operation as shown in the table below.

| FC[0:1] | Operation |
| --- | --- |
| 0 0 | 16 bit Op |
| 0 1 | Lower 8-bit Op |
| 1 0 | Upper 8-bit Op |
| 1 1 | Not Used |

FC[2]This specifes a read or write operation as shown below.

| FC[2] | Op |
| --- | --- |
| 1 | Read |
| 0 | Write |

Notice that it is for simplicity of tabulation that FC[0 ... 1] and FC[2] are separated. In bus operation, they are asserted at the same time. By using FC[0 ... 2], no bus operation, 8-bit read/write, and 16-bit read/write can be defined.

Figure 4:
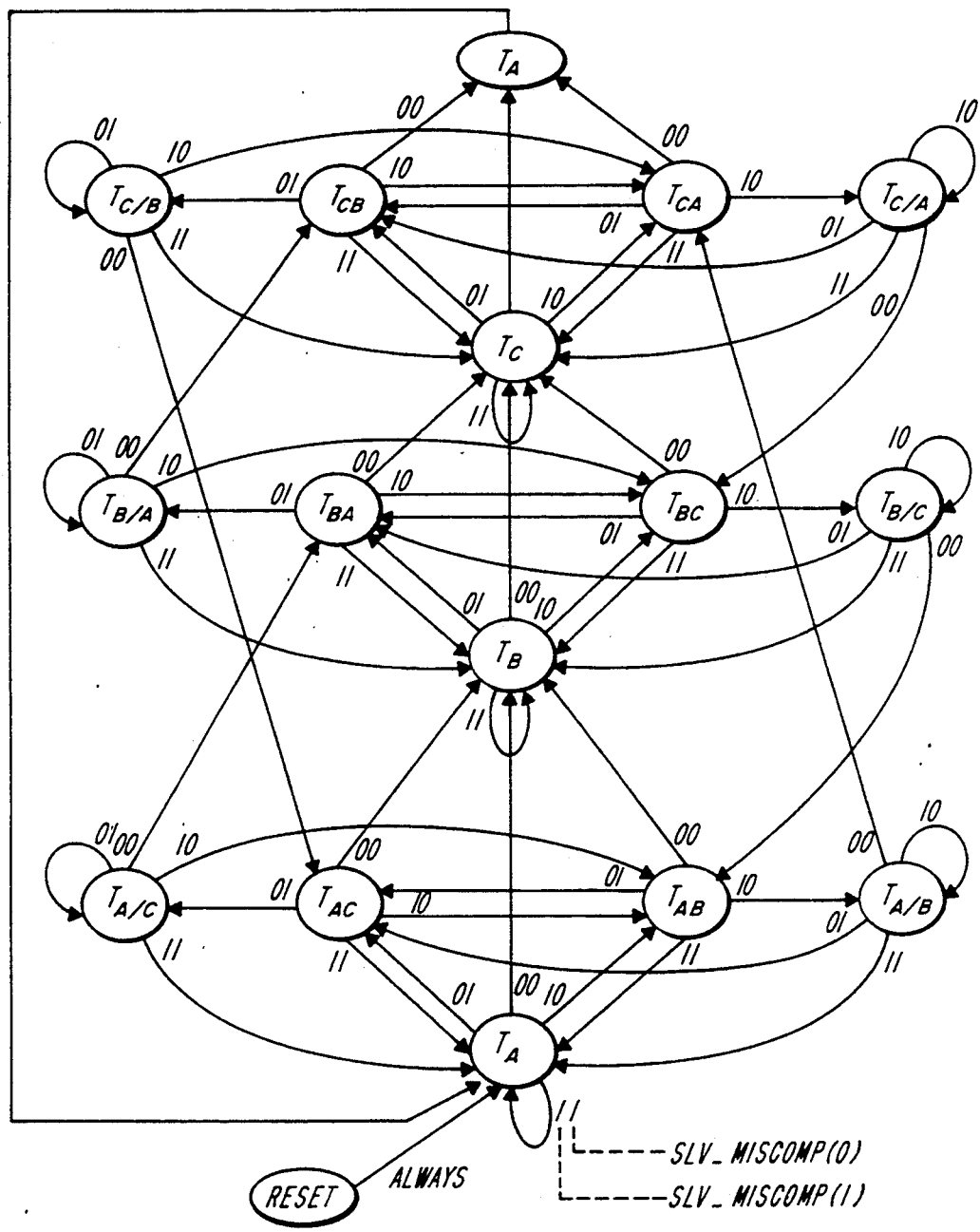
FIG. 4 is a diagrammatic representation of the overall state diagram of the system.

In FIG. 4, the over-all state diagram of the fault tolerant computer system is presented. Following is a partial flow of state transition.

```
Begin
    BoardA is the MST, BoardB is SL0, BoardC is SL1;
    Perform First Compare
    case   [1,1]no changes
           [1,0] Board B 1st miscompare is registered.
           Begin perform Second Compare
               case   [1,0] Board B is disabled
                      [1,1] Goto initial state
                      [0,1] Board B is O.K. Board C 1st miscomp
                      [0,0] Board C is MST, Board A 1st miscomp
               endcase
               Begin perform Third Compare
               ...
           [0,1] Board C 1st miscompare is registered.    /*similar to
                                                          /*case [1,0]
           [0,0]  Board B is MST /* no miscompare registered
                  Begin Second Compare
                  ...
```

The notation of States is according to the following scheme:

$T_x$:X is the master board. At the present state, no miscompare are registered.

$T_{xy}$:X is the master board. 1st miscompare is registered for Board Y.

$T_{xy}$:X is the master board. 2nd miscompare for Board Y and is removed from the system.

Figure 1:
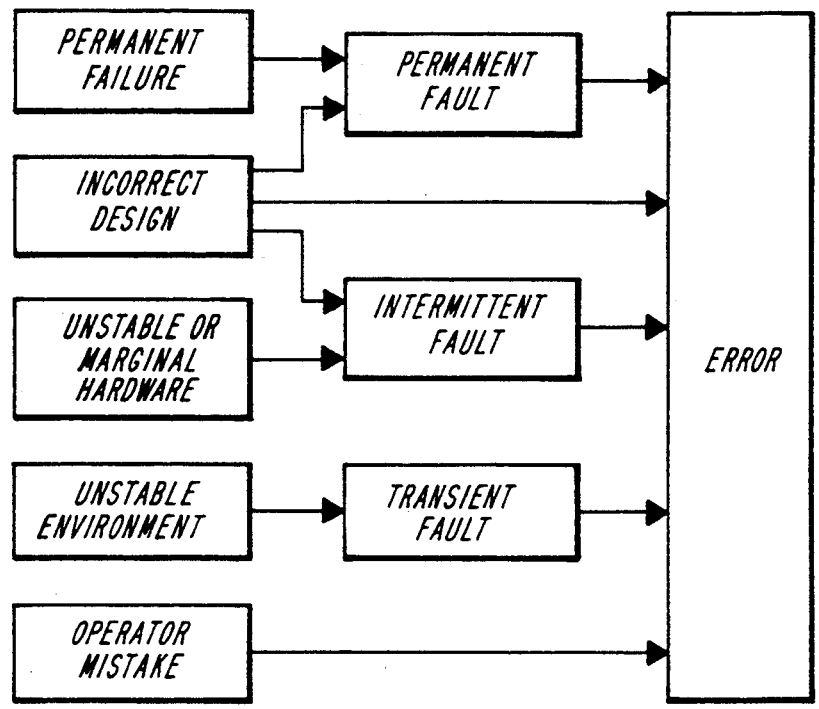
FIG. 1 illustrates the relationship of common types of computer error.
Figure 2:
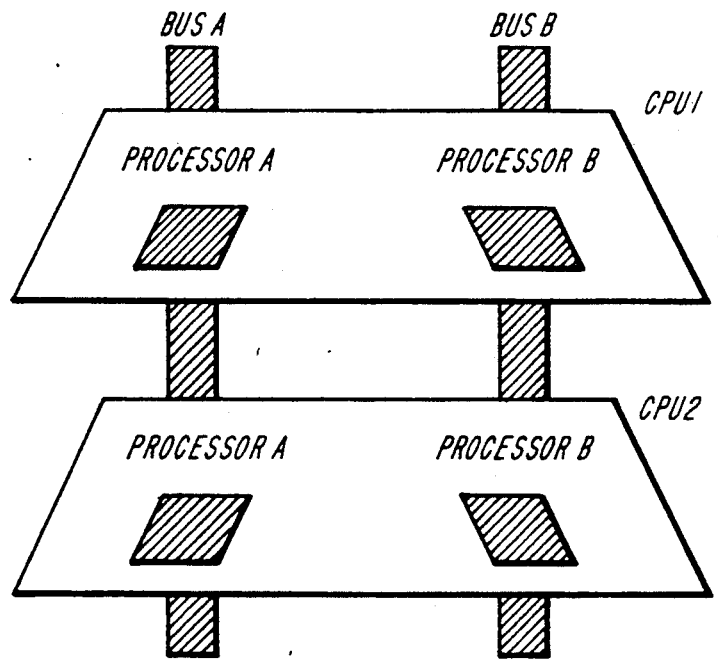
FIG. 2 illustrates a typical implementation of a pair-and-spare fault tolerant system.
Figure 5:
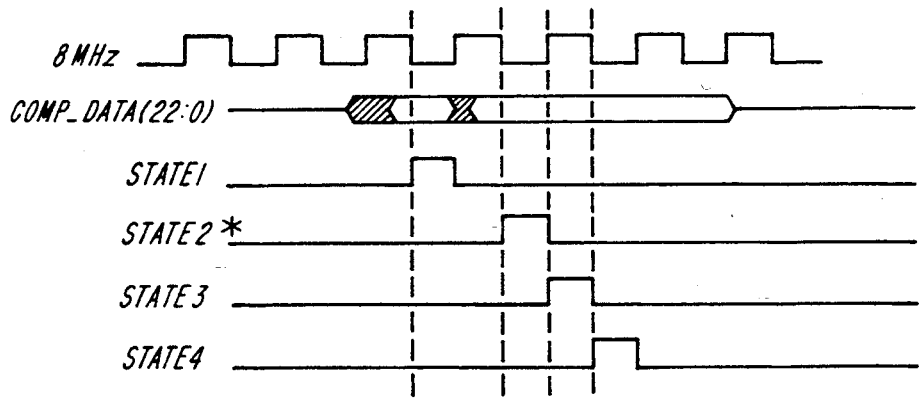
FIG. 5 is a timing diagram for voting bus operation.

FIG. 5 is a timing diagram for voting bus operation. The master board drives its address and data signal onto the Voting Bus COMP_DATA lines at two different times. All three CPU boards are responsible to generate a set of signals that maintains the state count on each local board.

At the rising edge of STATE1, Address is valid on the Voting Bus. The slave boards should register the address signals from the Voting Bus at this time.

At the rising edge of STATE2, Data is valid on the Voting Bus. The slave boards should register the data signals from the Voting Bus at this time.

At the rising edge of STATE3, all data are valid for comparison on slave boards. SLV MISCOMP[1:0] are produced as the result of the comparison.

At the rising edge of STATE4, all three boards resolve the state (being the MST, or SL0, or SL1) of the next cycle.

At this point, none of the specifics of the CPU board design relating to M68000 is discussed. The States referred in FIG. 5 are not the same as the States for the M68000 Read/Write operations. Until now, the functionality of the M68000 microprocessor is not discussed. For the sake of simplicity, the states for the Voting Bus operation are not named in reference to the microprocessor.

The Voting Bus protocol and time have been described. In this section, the logic circuit on the CPU board which interfaces with the Voting Bus is described in accordance with that protocol.

The following three major sections are contained below.

(1) The read and write operation of the M68000 microprocessor is described. The timing of the microprocessor dictates the design of the following two sections of the logic design.

(2) The Voting Bus Interface is described. The three-way-voting algorithm described before is implemented by distributing the voting decision making on all three boards. The three CPU boards monitor the two slave miscompare signals on the Voting Bus and decide what functional role it should assume for the next cycle.

(3) The error-detection mechanism is described. This section of the board contains logic circuits that compare two sets of data and generate a miscompare signal. Depending on the functional role of the board, the miscompare signal drives one of the two slave miscompare bits.

During a read cycle of the MC68000 processor used in the embodiment, the CPU board receives one or two bytes of data from the memory board via the system. If the instruction specifies a word or long-word operation, the MC68000 processor reads both the upper and lower bytes simultaneously by asserting both upper and lower data strobes (LDS,UDS). When the instruction specifies byte operation, the processor uses the internal A0 bit to determine which byte to read and issues the appropriate data strobe. When A0 equals zero, the upper data strobe is issued; when A0 equals one, the lower data strobe is issued. When the data is received, the processor internally positions the byte approximately. BUS_ADRS[0] is determined by the value to LDS and UDS. FC[0 ... 2] are determined by the value of LDS, UDS, and R/W_.

Figure 6:
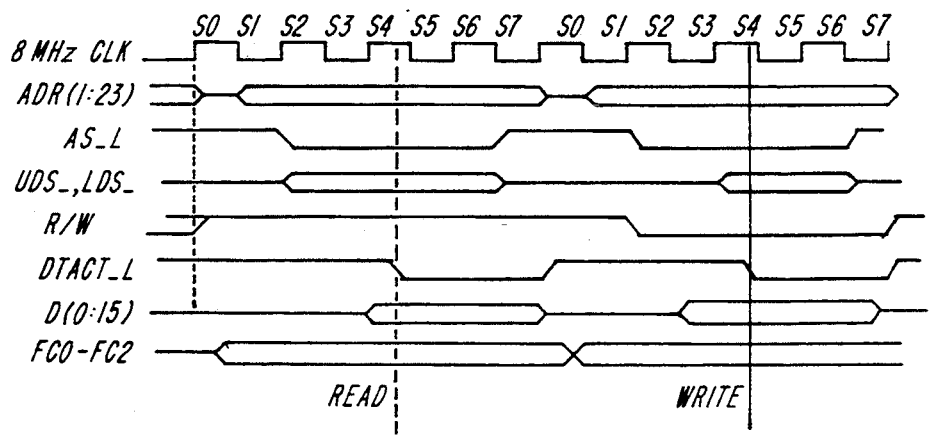
FIG. 6 illustrates the timing diagram for the read and write operation of the CPU in the system.

In a write cycle, the processor sends bytes of data to the memory. If the instruction specifies a word operation, the processor issues both UDS_ and LDS_ and writes both bytes. When the instruction specifies a byte operation, the processor uses the internal A0 bit to determine which byte to write and issues the appropriate data strobe. When the A0 equal zero, UDS__ is asserted; when A0 bit equals one, LDS__ is asserted. The read and write cycles are illustrated in FIG. 6.

The Read cycle is described in greater detail below.

STATE 0 The read cycle starts in state 0 (S0). The processor drive R/W__ high to identify a read cycle.

STATE 1 Entering state 1 (S1), the processor drives a valid address on the address bus on CPU board.

STATE 2 On the rising edge of state 2 (S2), the processor asserts AS__L and UDS__, LDS__. During S2, FC[0...2] are latched to the system bus.

STATE 3 During state 3 (S3), Data are returned from the memory board, from the rising edge of S3 till the falling edge of S6.

STATE 4 During state 4 (S4), the processor waits for a cycle termination signal (DTACK__ or BERR__) or VPA__ (this is not used in this system.) If neither termination signal is asserted before the falling edge at the end of S4, the processor inserts wait states (full clock cycles) until either DTACK__ or BERR__ is asserted.

STATE 5 During state 5 (S5), no bus signals are altered.

STATE 6 During state 6 (S6), data from the device is driven onto the data bus.

STATE 7 On the falling edge of the clock entering state 7 (S7), the processor latches data from the addressed device and negates AS__ and UDS__, LDS__. FC(0...2) are driven to high impedance state. At the rising edge of S7, the processor places the address bus in the high-impedance state. The processor places the address bus in the high-impedance state at the rising edge of S7. The device negates DTACK__ at this time.

The Write cycle is described in greater detail below.

STATE 0 The write cycle starts in S0. The processor drive R/W__high (if a preceding write cycle has left R/W__low). STATE 1 Entering S1, the processor drives a valid address on the address bus.

STATE 2 On the rising edge of S2, the processor asserts AS__ and drives R/W low.

STATE 3 During S3, the data bus on the CPU board is driven out of high-impedance state as the data to be written is placed on the bus.

STATE 4 At the rising edge of S4, the processor asserts UDS__, LDS__. The processor waits for a cycle termination signal (DTACK__ or BERR__) or VPA__ which is not used in this design. If neither termination signal is asserted before the falling edge at the end of S4, the processor inserts wait signals (full clock cycles) until either DTACK__ or BERR__ is asserted.

STATE 5 During S5, no bus signals are altered.

STATE 6 During S6, no bus signals are altered.

STATE 7 On the falling edge of the clock entering S7, the processor negates AS__, UDS__, LDS__. FC[0...2] is put in high-impedance state by the CPU board. As the clock rises at the end of S7, the processor places the address and data buses in the high-impedance state, and drives R/W__ high. The device negates DTACK__ at this time.

Instead of having one central device which governs the states of three CPU boards, the state machine described in FIG. 4 is broken down to three identical sub-state machines programmed in the three PALs (programmable logic arrays) which are situated on each CPU board. There are four signals that the device monitors, BRD__INDEX[1:0], and SLV__MISCOMP L[1:0]. The outputs of the device are only used in that individual board. The output signals are, IM MST,IM__SL0.

Figure 7:
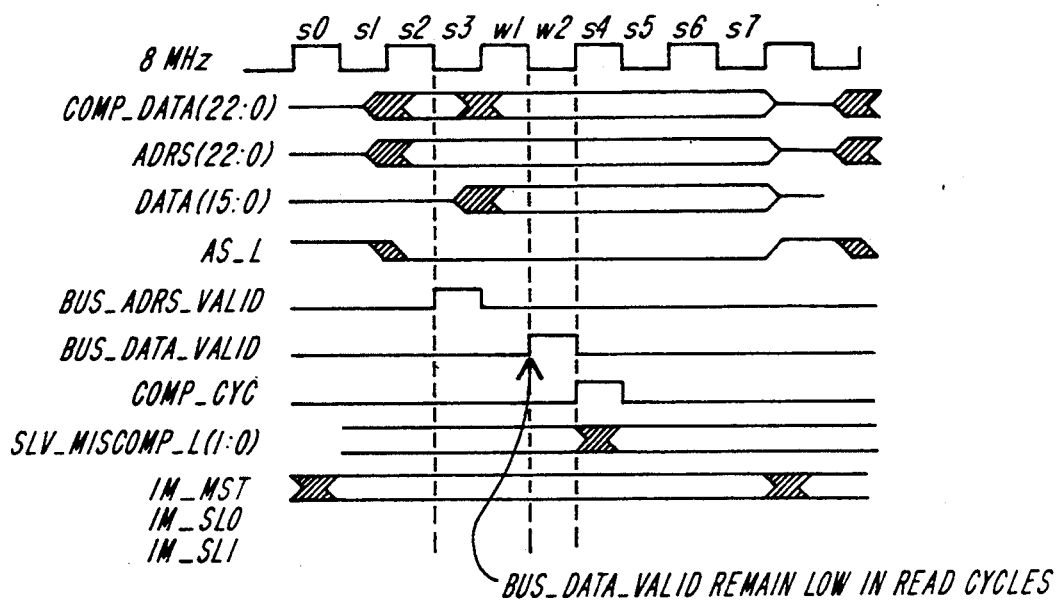
FIG. 7 is a timing diagram for the voting bus interface.

The signals relating to the voting state machine are described below, and the timing diagram for the voting bus interface is illustrated in FIG. 7 and is explained below.

BRD__INDEX[1:0] These two signals are from the Voting Bus. In Slot A, B, and C, these signals are tied to the A__BRD__INDEX[1.0], B__BRD__INDEX[1:0], and C__BRD__INDEX[1:0] respectively.

SLV__MISCOMP__L[1:0] These two signals are obtained from the Voting Bus. The value of these two signals are identical on all three boards at any time.

IM__MST When this signal is logic high, it indicates that the board is the Master Board of the system.

IM__SL0 When this signal is logic high, it indicates that the board is the Slave 0 Board of the system.

IM__SL1 When this signal is logic high, it indicates that the board is the Slave 1 Board of the system. For the simplicity of the PAL programming, this signal is not a output of the state machine. Because the outputs of the PAL used in the design are registered outputs, it is valid one clock tick after the IM__SL0 and IM__MST are valid.

BUS__ADRS__VALID At the rising edge of this signal, the address on the voting bus is valid and should be registered onto the local CPU board. The address is valid until the falling edge of this signal.

BUS__DATA__VALID At the rising edge of this signal, the data on the voting bus is valid and should be registered onto the local CPU board, the data is valid until the falling edge of this signal.

COMP__CYC At the rising edge of this signal, SLV__MISCOMP[1:0] is valid on the Voting Bus and should be registered on the local board. At this time, a signal indicating a bus-error requiring a previous cycle re-execution or a data-acknowledge should be issued.

Figure 8:
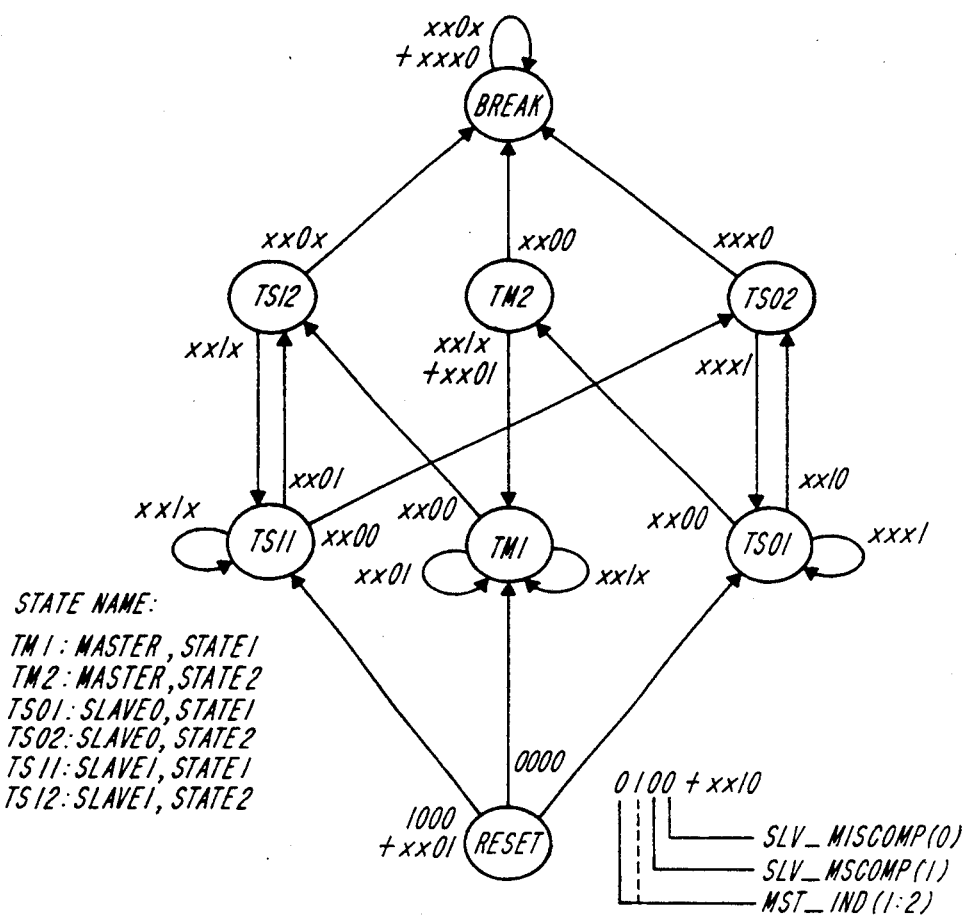
FIG. 8 is a state diagram for the distributed voting mechanism.

The state diagram for the distributed voting mechanism is shown in FIG. 8.

A number of features are emphasized below:

Rotational feature. Any board can be either Master, Slave 0 or Slave 1 depending on the present state and the value of the SLV__MISCOMP__L[1]:. The pattern is illustrated as follows:

```
Begin
   ***
      I am Slave0.
      case   [x,1] I am o.k. no changes
             [1,0] I am bad for the first time.
                Begin get second set of miscompare
                   case   [x,0] I'm bad for the 2nd time, remove
                          [x,1] 1st bad record erase. I'm still Slave0
                endcase
```

```
               Begin get next miscompare
***
     [0,0] I am bad, so is the other board. I become Master.
          Begin Second Compare
               case    [0,0] I'm bad for the 2nd time, remove
                       [1,x] & [0,1] I agree with one or both slave,
                                    I am master.
                                    Begin get next miscompare
                                    if [0,0] then
                                         Both slv disagree.
                                    I become Slave1.
                                         else no change . . .
```

Live-Insertion Availability. When a board is removed from the system, the system is no longer protected against fault. To recover fault tolerance of the system, a third board must be brought on-line synchronous with the other three boards. Following is a scheme by which the Distributed Voting Machine decides which function board it should be.

```
Begin
   get miscompare
      case [0,0] begin initial instlment  /*It is impossible to
                                          /*have [0,0] when there
                                          /*are less than three
                                          /*boards in the system.
          case SlotA Master
               SlotB Slave 0
                    SlotC Slave 1
               encase
          [1,0] go to Slave0
          [0,1] go to Slave1
          [1,1] impossible case /*when SLV_MISCOMP_L is not
                                /*driven by a slave, it is
                                /*pull low.
      encase;
***
```

State machine fault protection. In the event that PAL has error, the system is partially protected.

Un-recoverable catastrophe. Since the voting mechanism is distributed onto three boards, the system is protected from PAL error with one exception. That is when two boards assume the role of the Master and one assumes the role of Slave1, there is only one slave and if there is a miscompare on that slave, SLV_MISCOMP_L[1:0] is [0,0]. Consequently, master becomes Slave1 and the former Slave1 becomes Slave0. The second compare will undoubtly fail because there is no master board to drive the data onto the Voting Bus. All three boards will be removed from the system. This is what is commonly called double error.

Figure 9:
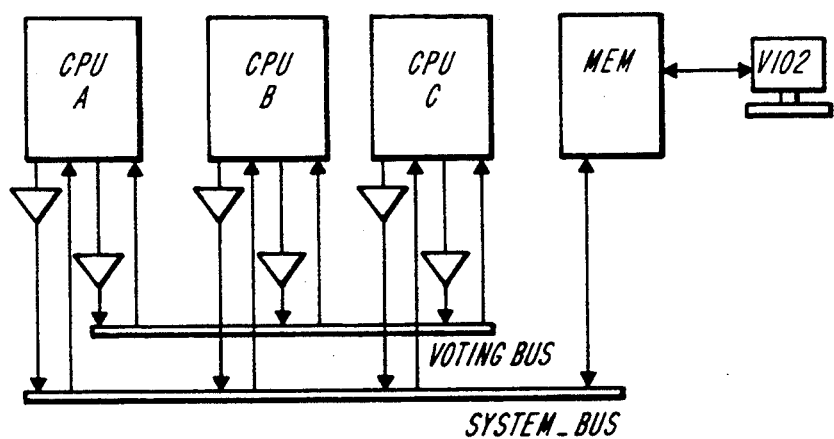
FIG. 9 is a diagram of the configuration of the CPU's, memory and buses of the system.

In the system, there are two logical boards, the CPU and the memory. As shown in FIG. 9 there are three CPU boards designated as Board A, Board B and Board C, which are identical to each other. Each one of these three boards performs identical functions during the read cycle. On the other hand, during the write cycle, only the master board has access to the System and Voting Bus.

The memory board is a simplex logic board. It interfaces with the CPU via the System Bus. Included in the memory board is a section which utilizes a Universal Asynchronous Receiver/Transceiver (UART) to interface with a V102 terminal.

The System Bus signals are as follows.

Address Bus (SYS_ADRS<1 ... 23>) This 23 bit, unidirectional, three-state bus is capable of addressing up to 16 Mbytes of data. It provides the address for bus operation during read and write cycles of the memory board.

Data Bus (SYS_DATA <0 ... 15>) This bidirectional, three-state bus is the general-purpose data path. It is 16 bits wide and can transfer data of width 8 bits and 16 bits.

Synchronous Control (SYS_CODE1,-SYS_CODE2,SYS_CODE3,SYS_CODE4) These three signals are valid only during system bus cycles. They provide the timing control for memory board during read and write cycles. When SYS_CODE1 is low, valid address is placed on the System Bus by the CPU board. When SYS_CODE2 is low, the memory board registers that address onto the memory board. When SYS_CODE3 is low, during bus read cycle, the memory board places data on System Bus, and vice versa, during bus write cycle, the CPU board places data on the system bus. When SYS_CODE4 is low, data on the System Bus is registered on the memory board or the CPU board during system write and read cycle respectively. SYS_CODE1 going high indicates the end of a bus cycle.

System Function Code (FC<0...2> This is a 3-bit function code issued by the CPU board which specifies a 16-bit or 8-bit read or write operation.

| FC<2..0> | Operation |
|---|---|
| 000 | 16-bit write |
| 001 | Upper 8-bit write |
| 010 | Lower 8-bit write |
| 011 | Not Used |
| 100 | 10-bit read |
| 101 | Upper 8-bit read |
| 110 | Lower 8-bit read |
| 111 | Not Used |

System Memory Interface Control (SYS_MEM_SEL_L) During system bus cycles, the memory board sends out a signal to the CPU board indicating that the memory has been selected by asserting this signal low.

Clock (SYS_CLK) This is a 8 MHz clock which is generated from a 8 MHz clock card mounted on the system bus back panel.

Board Indicator (SYS_MSTR_INDEX <0...1>) This 2-bit signal determines the location of the CPU board. By pulling these bits high or low in a particular slot on the back panel, CPU boards inserted in these slots are assigned as Board A, Board B, and Board C.

| Index <0..1> | BRD |
|---|---|
| 0 0 | A |
| 0 1 | B |

-continued

| Index <0..1> | BRD |
|---|---|
| 1 0 | C |
| 1 1 | Not Used |

Figure 10:
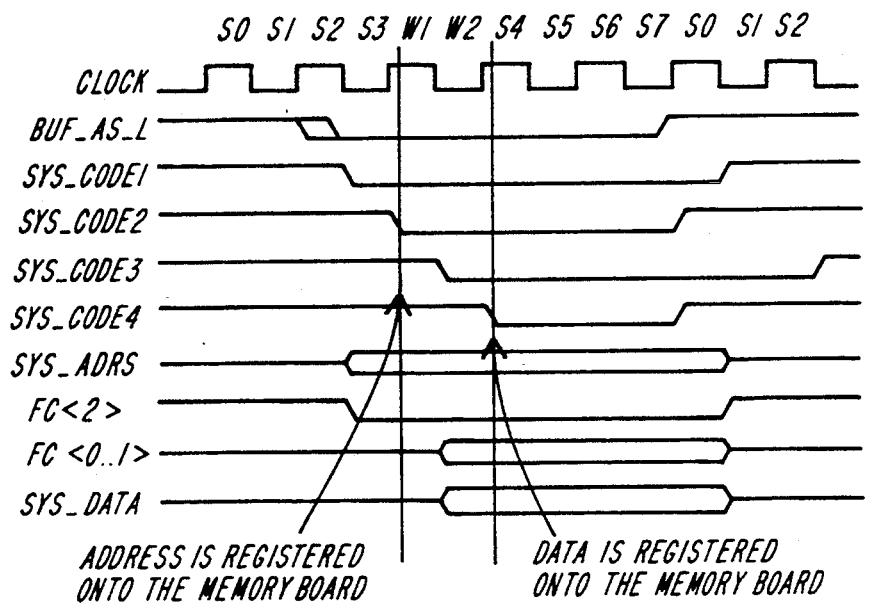
FIG. 10 is a timing diagram for the system bus write cycle.

The write operations on the system bus are illustrated in FIG. 10.

Figure 11:
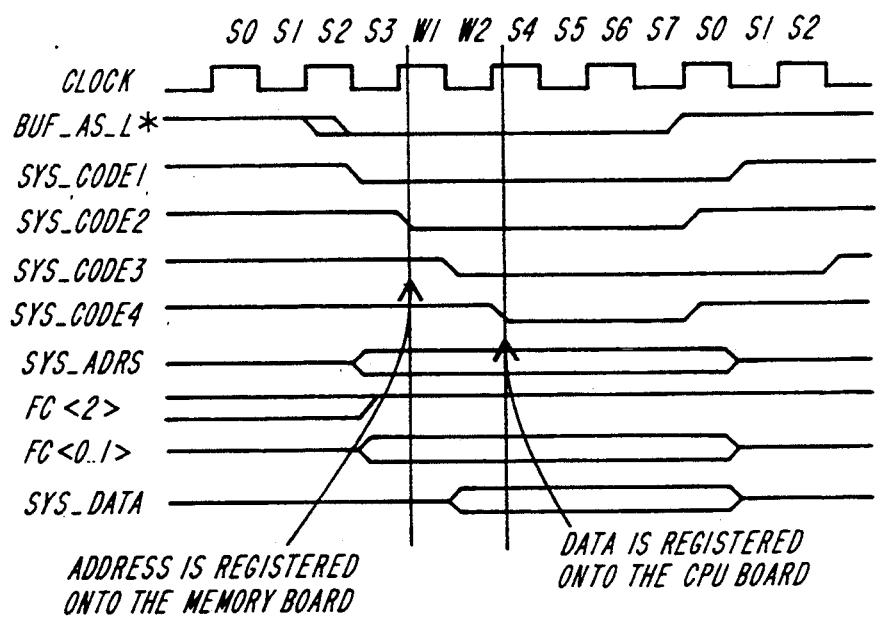
FIG. 11 is a timing diagram for the system bus read cycle.

The read operations on the system bus are illustrated in FIG. 11.

Figure 12:
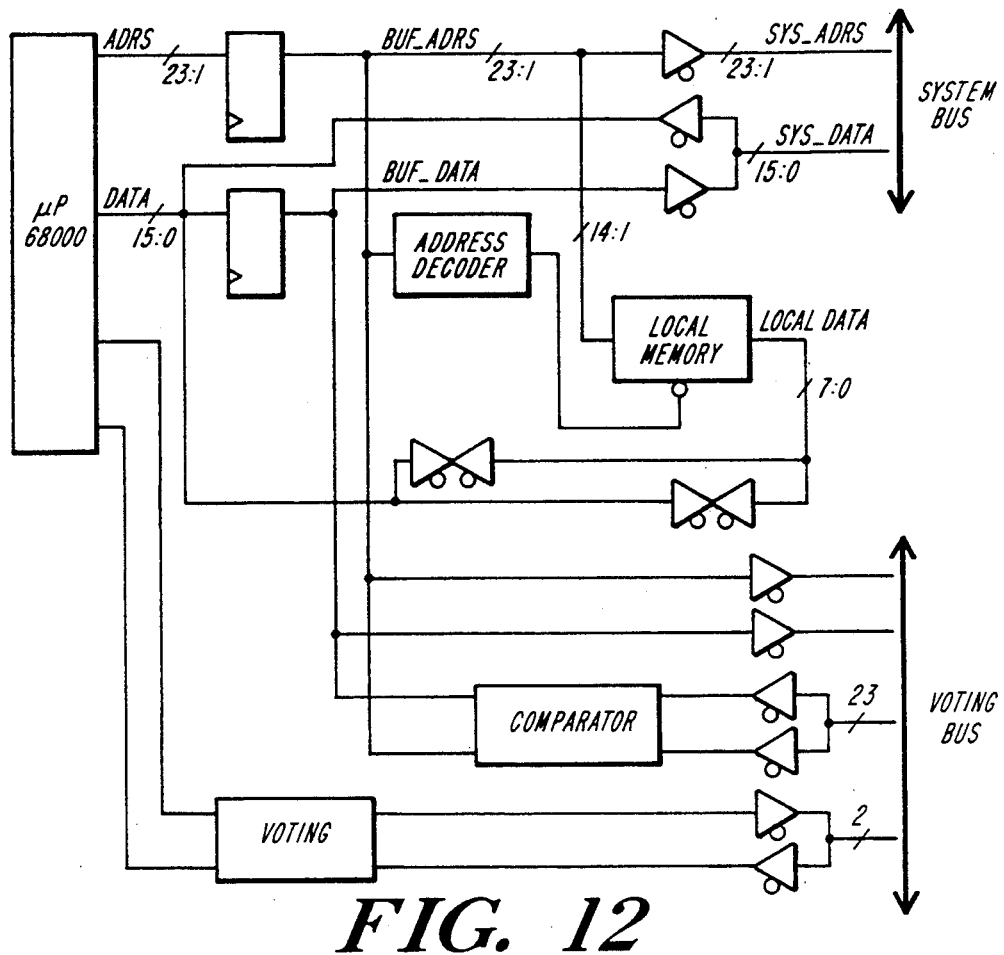
FIG. 12 is a block diagram of the CPU of the system.

As shown in FIG. 12, the CPU board includes four major sections, the microprocessor and its associated logic circuit, the local memory, and System Bus interface and the Voting Bus interface which in turn includes a set of comparators and a voting machine.

The local memory on the CPU board is a 32K×8 Xicor Electrically Erasable Prom (EEprom). The memory is directly mapped to the CPU memory space in word size and it is addressed by 14 address lines. The LOW_BYTE_DTS_L determines the high byte or low byte be read or written to. Only 8-bit operations are allowed when accessing the EEprom. The address space of the local memory is $000000_{HEX}$-$007FFF_{HEX}$.

EEprom write cycles are controlled by chip select (CS_L) bits on the EEprom.

There are three sets of signals being sent to the System Bus, address lines, data lines, and control signals. The System Bus interface on the CPU board is responsible for controlling the "gate" between the signals on the board and the bus lines. All signals are latched onto the bus only if, one, the board is the master board in the system, two, it is addressing the system memory space. Otherwise the gate will be held at tri-state.

All three CPU boards in the computer system latch the COMP_DATA signals from the Voting Bus. The signals are compared with the address and data signals on each individual board at the appropriate time. The equality of the signals is resolved before the COMP_CYC during which cycle, one, the next state of each board is decided, and two, the data from the master board is written onto the System Bus.

The following is a description of the Memory Board used in the system. The section is sub-divided into four parts. The first part describes the operation of the static ram. The second part includes a block diagram of the memory board. In the third part, the timing of the read/write operation of the memory board is illustrated. The last part describes the SIO operation.

The CY7C128 is a high performance CMOS static RAM organized as 2048 words by 8 bits. An active LOW write enable signal (WE_L) controls the writing/reading operation of the memory. When the chip enable (CE_L) and write enable (WE_L) inputs are both LOW, data on the eight data input/output pins (I/O$_0$ through I/O$_7$) is written into the memory location addressed by the address present on the address pin (A$_0$ through A$_{10}$). Reading the device is accomplished by selecting the device and enabling the outputs, CE_L and OE_L active LOW, while (WE_L) remains inactive or HIGH. Under these conditions, the contents of the location addressed by the information on address pins is present on the eight data input/output pins.

Figure 13:
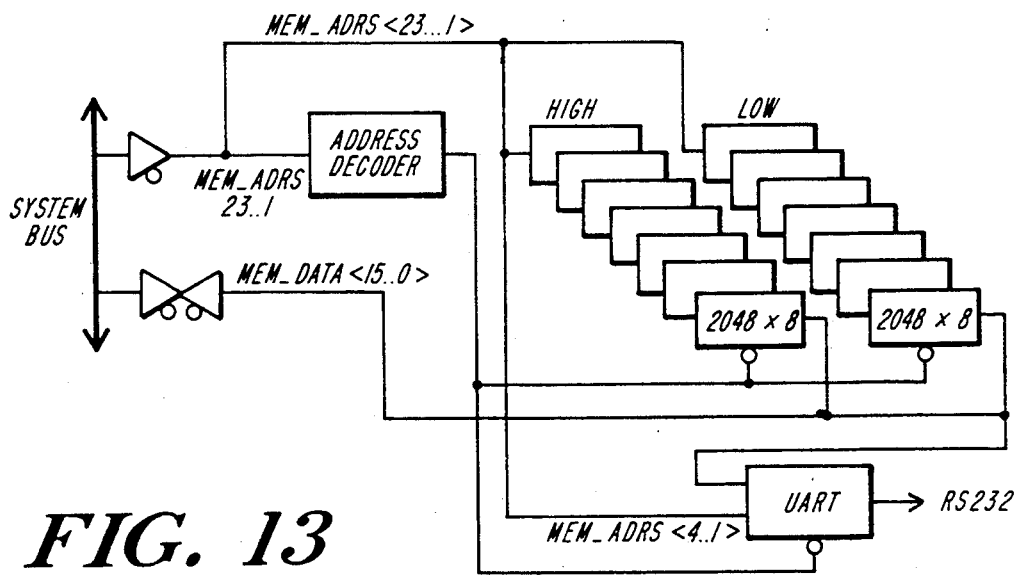
FIG. 13 is a block diagram of the memory board of the system.

A block diagram of the memory board appears as FIG. 13. The memory board accesses the System Bus only. During system operation cycles, the memory board registered the address and control signals on the System Bus. An address decoder on the memory board divides the board into two address spaces, the SRAM space and the UART space. The SRAM can perform high byte operation, low byte operation and word operation, whereas the UART may only perform low byte operation.

The address space of the memory and the UART is listed as follows:

Memory: $010000-07BFFF_{HEX}$

UART: $800000-FFFFFE_{HEX}$

Figure 14:
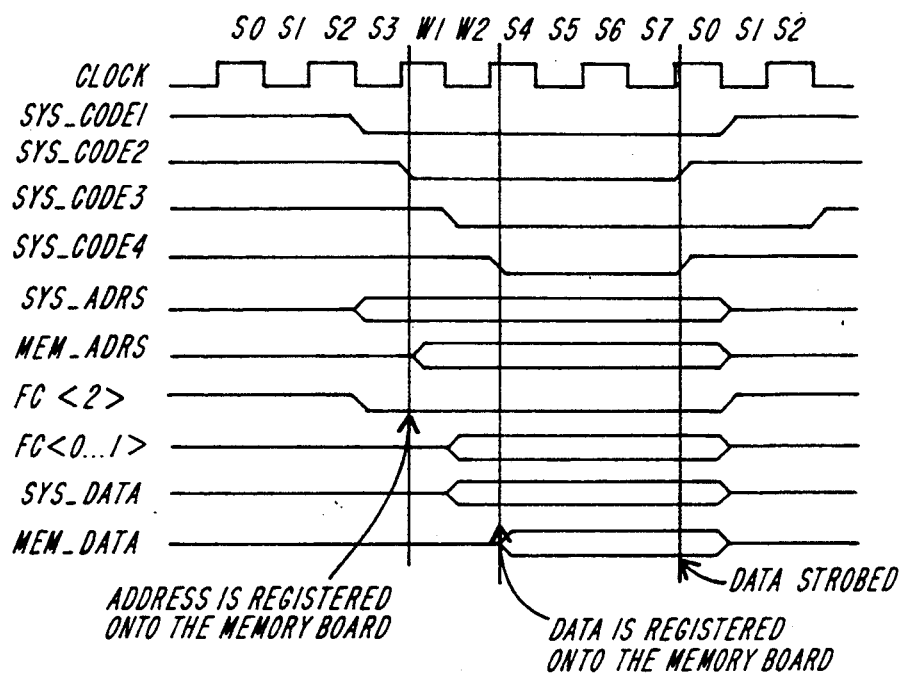
FIG. 14 is a timing diagram for the memory board write cycle.
Figure 15:
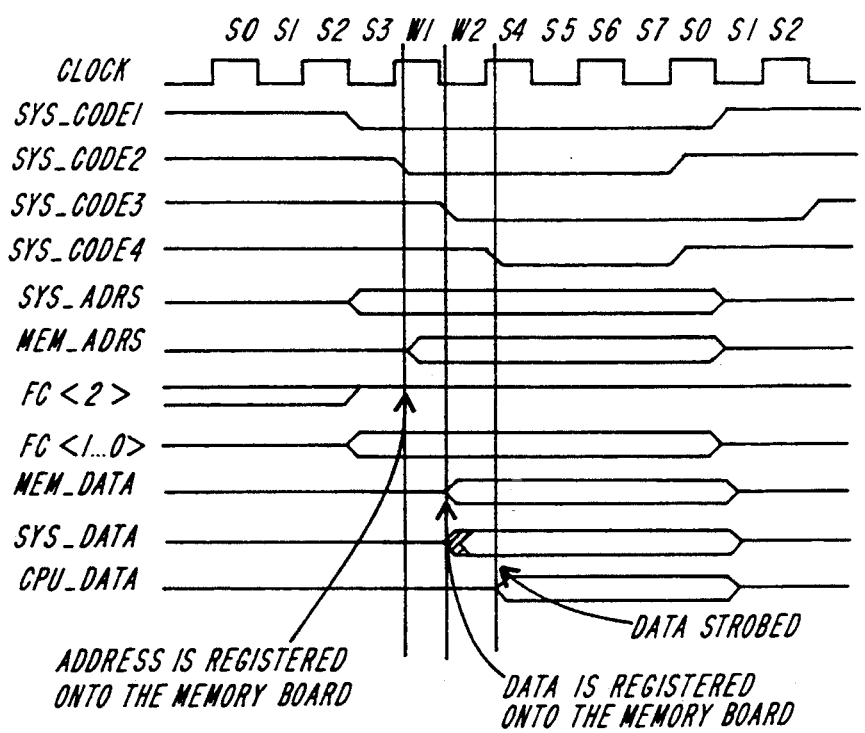
FIG. 15 is a timing diagram for the memory board read cycle.

Refer to FIGS. 14 and 15 for timing diagrams of the read and write operations of the memory board.

Due to the timing constraint, the buffer that drives the memory data is enabled at the same time the data from the SRAM is valid. The consequence is that there is a small amount of time during which the data on the system bus is not valid. This does not hamper the operation of the system because one, the SYS_DATA is valid when the CPU board is ready to latch it in, and two, no comparison cycle is performed during read cycle.

The serial I/O port on the memory is to provide terminal I/O capabilities for the use of stand-alone debugging. The design is based on the Motorola 68681 Dual Asynchronous Receiver/Transmitter (DUART), which provides two serial I/O ports, 8 parallel I/O lines, a bi-directional data bus to the CPU.

The MC68681 DUART is a MC68000 family peripheral which interfaces with the processor via an asynchronous bus structure. The major functions of the DUART utilized in the SIO application are described below.

The internal control logic receives operation commands from the CPU and generates appropriate signals to the internal sections to control device operation. It allows the registers within the DUART to be accessed and various commands to be performed by decoding the four register-select lines (RS1 through RS4). Besides the four register-select lines, there are three other inputs to the internal control logic from the CPU:read/write_1, chip select (CS_L), and reset (RESET_L).

The timing logic consists of a crystal oscillator, a baud-rate generator (BRG), a programmable counter/timer, and four clock selectors. The crystal oscillator operates directly from a 3.68684 MHz crystal. The clock serves as the basic timing reference for the BRG, the counter/timer, and other internal circuits.

The BRG operates from the oscillator and is capable of generating 18 commonly used data communication baud rates ranging from 50 to 38.4K by producing internal clock outputs at 16 times the actual baud rate. The baud rate for the SIO application is set at 9600.

Each communication channel comprises a full duplex asynchronous receiver/transmitter (UART). The operating frequence for each receiver and transitter can be selected independently from the baud-rate generator.

The transmitter accepts parallel data from the CPU, converts it to a serial bit stream, inserts the appropriate start, stop and optional parity bits, and outputs a composite serial stream of data on the T×D output pin. The receiver accepts serial data on the R×D pin, converts this serial input to parallel format, checks for a start bit, stop bit, parity bit, or break condition, and transfers an assembled character to the CPU during a read operation. The parameters used for the SIO defining stop bits, word length, parity, and baud rate are:

BAUD:9600

WORD:7 bit
PRTY:ODD
STOP:1
COMM:FDX
HAND:X-ON

The character output routine begins by checking the UART status register for the TxRDY and TxEMT bits being set. These bits indicate that the transmitter buffer is empty and the transmitter is not currently sending a character. By checking these bits before sending each character, transmitter overrun is prevented without using the RTS/CTS protocol.

Since character output is initiated by the CPU, there is no danger of losing data during transmission.

The objective of the invention was to design a fault tolerant computer system using three way-voting. It was fulfilled with two major achievements. One is that the system tolerates more than one fault, single-point failure, by comparing all critical signals from mirrored parts of the system. This is a major improvement on some existing commercial products that employ hardware fault tolerance.

Secondly, by adopting the master-slave algorithm, essentially there is only one set of signals on the common bus. This eliminates the problem of having three sets of signals on the common bus and therefore creating an unmanageable wide busband-width. As the system becomes more and more complicated, the issue of bus band-width becomes increasingly critical, for example, the use of a more advanced microprocessor, wider address and data lines, etc. Also, due to the master-slave algorithm, the broken board can be isolated from the system without performance degradation.

Finally, from an economic perspective, having three mirrored parts in the system is more cost effective than having four.

Without limiting the invention, meant to be defined by the following claims, the following is an elaboration of three way voting state machine PAL (programmable logic arrays) equations used in carrying out the embodiment of the invention.

```
module state _machine;
flag '-r3';
title ' State Machine for Three-Way-Voting
         Douglas Cheung 11/16/90
         Stratus Computer Inc.';
ft0101 device 'P22V10';
"REV 01 History
"Rev 01-01: Distribute the state maching to all
"           three cpu boards.
"           11/28/90
" ****INPUTS****
gnd, vccpin 12, 24;    "power and ground
slv_miscomp_1_0        pin 10;
slv_miscomp_1_1        pin 11;
clk                    pin 1;
clr                    pin 2;
mstr_index_0           pin 3;
mstr_index_1
" ****OUTPUTS****
im_mst     pin 15;
im_sl      pin 16;
im_a       pin 17;
im_b       pin 18;
im_c       pin 19;
code_0     pin 20;
code_1     pin 21;
code_2     pin 22;
break      pin 23;
" ****CONSTANTS****
x, ck = .X , .C;
" ****STATES****
FT00 = [code_2, code_1, code_0];
Tinit = ^b000;
TM1   = ^b001;
TM2   = ^b010;
TS01  = ^b011;
TS02  = ^b100;
TS11  = ^b101;
TS12  = ^b110;
" ****INPUT MODE****
Mode = [clr, mstr_index_1, mstr_index_0, slv
miscomp_1_1, slv_miscom-p_1_0];
brd_a              = [0, 0, 0, 0, 0];
brd_b              = [0, 0, 1, 0, 0];
brd_c              = [0, 1, 0, 0, 0];
both_slv_miscomp   = [0, x, x, 0, 0];
slv_1_miscomp_only = [0, x, x, 0, 1];
slv_0_miscomp_only = [0, x, x, 1, 0];
both_ok            = [0, x, x, 1, 1];
reset              = [1, x, x, x, x];
" ****state diagram equations
state_diagram FT00
State Tinit:
    case   (Mode == brd_a)                :TM1;
           (Mode == brd_b)                :TS01;
           (Mode == brd_c)                :TS11;
           (Mode == slv_0_miscomp_only)   :TS01;
           (Mode == slv_1_miscomp_only)   :TS11;
           (Mode == reset)                :Tinit;
    endcase;
State TM1:
    case   (Mode == slv_1_miscomp_only)   :TM1;
           (Mode == slv_0_miscomp_only)   :TM1;
           (Mode == both_ok)              :TM1;
           (Mode == both_slv_miscomp)     :TS12;
    endcase;
State TM1:
    case   (Mode == slv 1 miscomp_only)   :TM1;
           (Mode == slv_0_miscomp_only)   :TM1;
           (Mode == both_ok)              :TM1;
           (Mode == both_slv_miscomp)     :Tinit;
    endcase;
State TS01:
    case   (Mode == slv_0_miscomp_only)   :TS02;
           (Mode == slv_1_miscomp_only)   :TS01;
           (Mode == both_ok)              :TS01;
           (Mode == both_slv_miscomp)     :TM2;
    endcase;
State TS02:
    case   (Mode == slv_0_miscomp_only)   :Tinit;
           (Mode == slv_1_miscomp_only)   :TS01;
           (Mode == both_ok)              :TS01;
           (Mode == both_slv_miscomp)     :Tinit;
    endcase;
State TS11:
    case   (Mode == slv_1_miscomp_only)   :TS12;
           (Mode == slv_0_miscomp_only)   :TS11;
           (Mode == both_ok)              :TS11;
           (Mode == both_slv_miscomp)     :TS02;
    endcase;
State TS12:
    case   (Mode == slv_1_miscomp_only)   :Tinit;
           (Mode == slv_0_miscomp_only)   :TS11;
           (Mode == both_ok)              :TS11;
           (Mode == both_slv_miscomp)     :Tinit;
    endcase;
equations
![code_2, code_1, code_0]:= (Mode ==reset) & [1, 1, 1];
          im_mst  := !code_2 & [code_1 $ code_0);
im_sl0    := (code_2 & !code_1 & !code_0) # (!code_2 &
code_1 & code_0);
break     := (code_2 & code_1 & !code_0 & !slv_miscomp
1_1) # (!code_2 &
          (code_1 & !code_0 & !slv_miscomp_1_1 &
!slv_miscomp_1_0)
          # (code_2 & !code_1 & !code_0 & !slv_miscomp
1_0);
im_a := !mstr_index_1 & !mstr_index_0;
im_b := !mstr_index_1 & mstr_index_0;
im_c := mstr_index_1 & !mstr_index_0;
```

```
end
```

What is claimed is:

1. In a fault-tolerant digital data processor of the type having plural functional units interconnected along system bus means for transferring signals therebetween,
wherein a first such functional unit responds to an input signal received on said system bus means from one or more other functional units for performing a first processing function on that input signal to generate an output signal, and for applying that output signal to said system bus means for transfer to one or more other functional units,
the improvement wherein said first functional unit comprises (n) processing sections interconnected along a voter bus means for transferring signals therebetween, and being coupled to said system bus means for receiving corresponding ones of said input signal therefrom, each said processing section comprising
A. processing means responsive to said input signal for performing said first processing function thereon to generate said output signal,
B. master means activated in response to a master state signal for applying to at least one of said bus means the output signal generated in response to at least a selected input signal,
C. slave means activated in response to a slave state signal for generating and applying to said voter bus means a match signal representative of a comparison of
i) the output signal generated by the processing means of that processing section in response to the input signal, and
ii) the output signal generated by the master means of another of said processing sections,
D. state means, coupled to said voter bus means and to each of said master and slave means, for maintaining a state of the respective processing section and for generating a signal representative of that state,
said state means including means for selecting said state from a group of states including a master state and one or more slave states,
E. said state means including voter means responsive to said state signal and to a combination of one or more match signals received on said voter bus means for selectively changing the state of the respective processing section.

2. In a fault-tolerant digital data processor according to claim 1, the further improvement comprising synchronizing means, coupled to the state means of each of said processing sections, for placing one of those processing sections in said master state and the others of those processing sections a slave state at a selected time.

3. In a fault-tolerant digital data processor according to claim 2, the further improvement wherein said state means include means for maintaining only one of said processing sections in said master state at any given time.

4. In a fault-tolerant digital data processor according to claim 1, the further improvement wherein (n) is equal to three.

5. In a fault-tolerant digital data processor according to claim 1, the further improvement wherein said state means includes means for selecting said state from a group of states including a master state and (n−1) slave states.

6. In a fault-tolerant digital data processor according to claim 1, the further improvement wherein said voter means includes means for changing the state of the respective processing section as a function of the current state of that processing section and said combination of one or more match signals received on said voter bus means.

7. In a fault-tolerant digital data processor according to claim 1, the further improvement wherein each said slave means include means for wire OR'ing their respective match signals onto said voter bus means.

8. In a fault-tolerant digital data processor according to claim 1, the further improvement wherein said first functional unit is a central processing unit and wherein said master means include means for generating said output signal to include at least one of data, address and control information.

9. In a fault-tolerant digital data processor according to claim 1, the further improvement wherein said voter means includes means responsive to said combination of one or more match signals received on said voter bus means indicating that all the output signals generated by the respective processing sections match for not changing the state of the respective processing section.

10. In a fault-tolerant digital data processor according to claim 1, the further improvement wherein said voter means associated with a processing section in said master state includes means responsive to said master state signal and said combination of one or more match signals received on said voter bus means indicating that the output signal generated by the respective processing section matched the output signal generated by at least one other processing section for not changing the state of the respective processing section.

11. In a fault-tolerant digital data processor according to claim 1, the further improvement wherein said voter means associated with a processing section in said slave state includes means responsive to said slave state signal and to
i) said combination of one or more match signals received on said voter bus means indicating that the output signal generated by the respective processing section did not match the corresponding output signal generated by a processing section associated with said master state, and
ii) said combination of one or more match signals received on said voter bus means indicating that the output signal generated by another processing section in said slave state did match the corresponding output signal generated by a processing section associated with said master state,
for changing the state of the respective processing section from one slave state to another slave state.

12. In a fault-tolerant digital data processor according to claim 1, the further improvement wherein said voter means of each of said processing sections includes means responsive to said combination of one or more match signals received on said voter bus means indicating that the output signal generated by a processing section associated with said master state did not match the corresponding output signals generated by a selected number of other processing sections in said slave state for
i) changing the state of the respective processing section, ii) re-performing said first processing function on said selected input signal to generate said output signal.

13. In a fault-tolerant digital data processor according to claim 1, the further improvement wherein A. said master means includes means for applying said output signal to said voter bus means,
B. said slave means includes means for comparing the output signal generated by the processing means of that processing section with the output signal received on said system bus means.

* * * * *